Oct. 22, 1935.  E. HAUGLAND  2,018,649

VEHICLE SQUEAK LOCATOR

Filed May 16, 1934  2 Sheets-Sheet 1

INVENTOR

Oct. 22, 1935.　　　　E. HAUGLAND　　　　2,018,649
VEHICLE SQUEAK LOCATOR
Filed May 16, 1934　　　2 Sheets-Sheet 2

INVENTOR

Patented Oct. 22, 1935

2,018,649

UNITED STATES PATENT OFFICE 2,018,649

VEHICLE SQUEAK LOCATOR

Erling Haugland, Brooklyn, N. Y., assignor of two-thirds to Asbjörn E. Ulfeng, Brooklyn, N. Y.

Application May 16, 1934, Serial No. 725,873

5 Claims. (Cl. 73—51)

This invention relates to improvement in equipment for servicing automobiles. Heretofore it has been common practice to drive an automobile over a bumpy road to locate squeaks. This, however, requires the full attention of two men and is therefore a costly and time wasting procedure. The first object of my invention is therefore to provide a machine which may be attended by one man only, and which will simulate the effects of driving over a rough road. A further object of my invention is to provide means whereby automobile springs and shackles may be thoroughly lubricated while in the service station, and requiring the attention of only one man. This latter factor is important in a busy service station where the number of attendants must be kept at a minimum. Another object of my invention is to provide a machine which may be operated with a small amount of electric energy, and which therefore has a low operating cost. Still another object is to provide a machine which may easily be added to present facilities in service stations without extensive alterations. A further object is to provide a machine which may be manufactured at low cost and which therefore may be added as standard equipment in all service stations. Another object is to provide a machine which has suitable jacks fitting the frame of any type of automobile, and by which the automobile may be quickly raised to a suitable operating position. Still further objects of my invention are to provide a machine which is compact, unobstructive and fireproof, while other objects will be evident from the following specification and claims.

I attain these objects by means as illustrated in the accompanying drawings, in which—

Similar numerals refer to similar parts throughout the several views.

Figure 1:
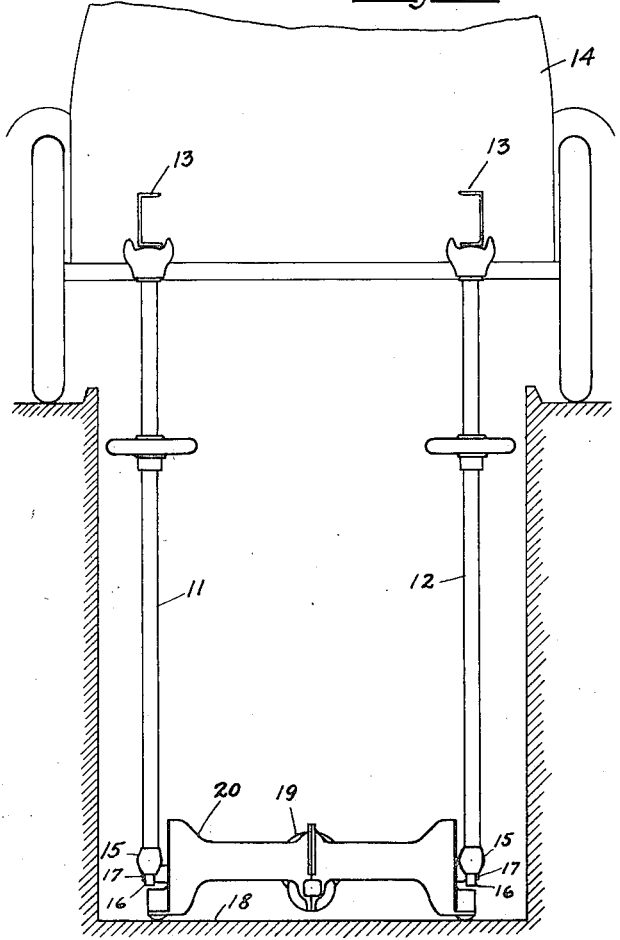
Fig. 1 is a general elevation showing the equipment installed in the common greasing pit of a service station.

Referring to Fig. 1 the jacks 11 and 12 are shown in position with their upper jaws supporting the frame 13 of the automobile 14. The lower ends of the jacks 11 and 12 are terminated in roller sockets 15 which are resting on the ball bearing 16 mounted on the crank pin 17. On the bottom of the pit 18 is mounted the motor 19 with transmission enclosed in housing 20.

Figure 2:
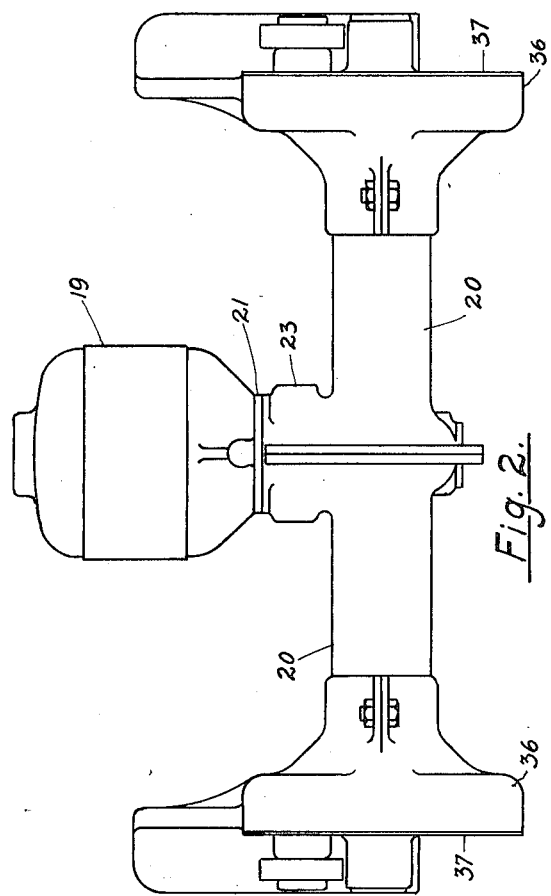
Fig. 2 is a plan view of the motor and transmission unit.
Figure 3:
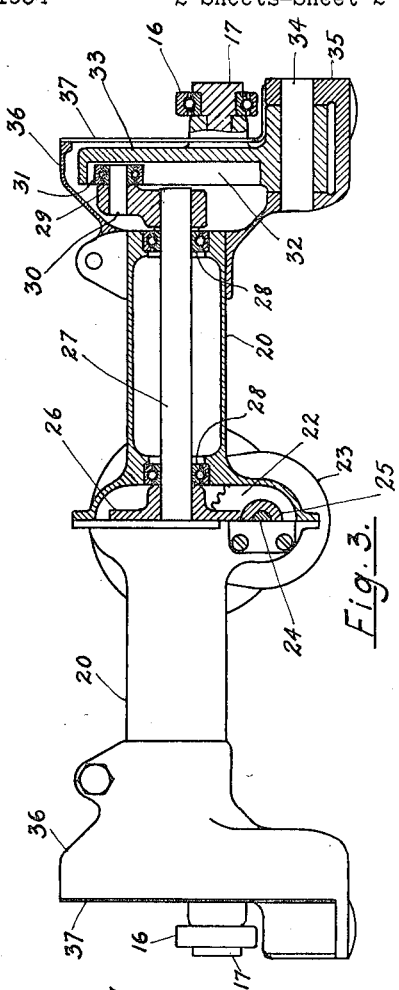
Fig. 3 is a fractional end elevation and section of the same unit.

Figures 2 and 3 show in more detail a preferred embodiment of my invention. The motor 19 is mounted with a flange 21 to the housing 20 containing the geared transmission. This transmission consists of a pinion mounted on the motor shaft driving gear 22, both located in the neck 23 of housing 20. On the same shaft 24 with gear 22 is located worm 25 engaging worm gear 26 driving the transmission shaft 27 journalled in ball bearings 28 located in housing 20 on both sides of the worm gear 26. Both sides of this transmission unit are identical and only one is therefore shown in section. On each end of shaft 27 is mounted a crank 29 having a crank pin 30 journalled in ball bearings 31. This crank pin 30 with ball bearing 31 is free to slide in slot 32 of lever 33. These parts are shown in side elevation in Fig. 10. On one side of lever 33 is integrally cast the crank pin 17 carrying ball bearing 16. At its lower end this lever 33 is journalled on pin 34 supported at both ends in footing 35. The latter footing 35 is an integrally cast part of housing 36 which is mounted on each end of housing 20. A cover 37 is removable for cleaning and lubrication. The action of crank pin 30 and lever 33 as well as crank pin 17 is clearly evident from Fig. 10. As the shaft 27 is rotated the crank pin 30 will slide in slot 32 and give the lever 33 a rocking movement. The crank pin 17 is thereby moved up and down with circular motion around pin 34. This movement, however, is only effective through a fraction of the circle around pin 34. The crank pins 17, which carry the weight of the car through jacks 11 and 12, thereby receive a rocking, up and down, motion which is propagated to the car.

Figure 10:
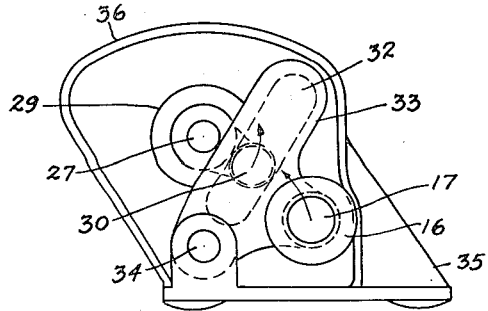
Fig. 10 is a partial side elevation of another embodiment of my invention.

The particular embodiment as described supra and as illustrated in Figures 2, 3, and 10 is preferred because the system of crank pins and levers is so designed as to give the motor an increasing force as the weight of the car is being lifted. The crank pin 30 sliding in slot 32 increases the effective length of lever 33 as the weight is being lifted. This is particularly desirable as the resiliency of the automobile springs will tend to increase the load as the crank pins 17 and thereby the jacks 11 and 12 are being moved upward. My invention therefore eliminates the danger of overloading the motor during starting and running, this also permits the use of a smaller motor. An extremely high over-all efficiency of the motor and transmission is obtained through the elimination of any friction surfaces by the use of ball bearings.

Figure 9:
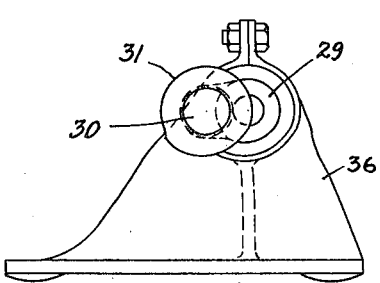
Fig. 9 is a partial side elevation of one embodiment of my invention.
Figure 4:
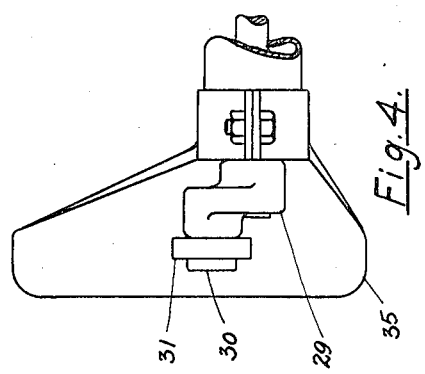
Fig. 4 is a fractional plan view of another embodiment of my invention.
Figure 5:
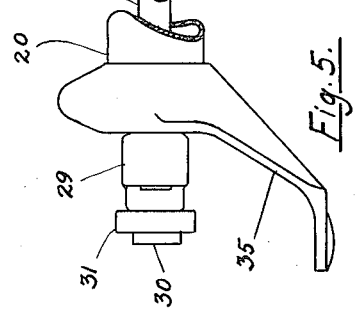
Fig. 5 is a fractional elevation of this latter embodiment of my invention.

In Figures 4, 5, and 9 is illustrated another embodiment of my invention. Due to the fact that the motor 19, speed reducer 23 and housing 20 are the same only a fractional plan view is shown in Fig. 4 while Fig. 5 is an end elevation and Fig. 9 a side elevation of this embodiment. The difference consists in that this embodiment has only one crank pin 30 at each end of shaft 27. This crank pin 30 carries as before a ball bearing 31 and takes the place of crank pin 17 and bearing 16 as described supra. The jacks 11 and 12 terminated in roller sockets 15 are in this case resting directly on bearing 31 and the movement of crank pin 30 is thus propagated directly to the car. The footing 35 is in this case slightly different as there is no need of a housing around the crank pin 30.

Figures 6, 7, 8:
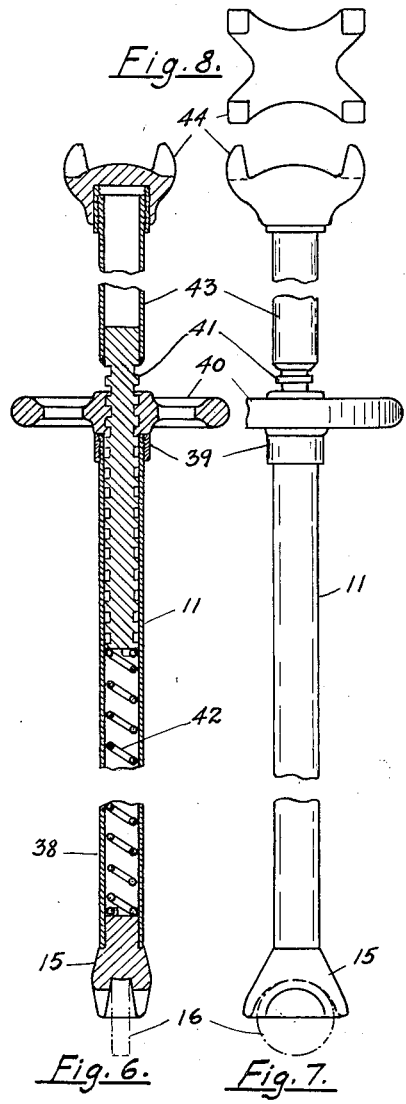
Fig. 6 is a sectional elevation of one of the special jacks.
Fig. 7 is a general elevation of the same jack.
Fig. 8 is a fractional plan view of the top jaw of the jack.

Referring to Figures 6, 7, and 8 the jacks 11 and 12 which are identical consist of a roller socket 15 which has a circular groove fitting over bearing 16. This socket 15 is fastened into the end of a steel pipe 38 the upper end of which has a flange 39 upon which rests the lower side of the hub of handwheel 40. The hub of handwheel 40 is tapped and acts as a nut for the jackscrew 41 which extends into the pipe 38. The jack-screw 41 rests on a spring 42 contained in pipe 38 the upper end of screw 41 terminates in a pipe 43 which again is fastened into the jaws 44. Due to the fact that the flange width of standard automobile frames vary between certain definite dimensions the jaws 44 are made to fit the largest frames transversally as shown in Fig. 8 while the smallest frames will fit across the other way by turning the jaws 90 degrees. The operation of the jack is as follows: The spring 42 has sufficient tension to push the jaws up to a height slightly higher than the level of the frame 13 as shown in Fig. 1. The operator, therefore, only has to take hold of pipe 43 and force the screw 41 down against the force of the spring 42 until the jaws can be pushed under the frame 13. The handwheel 40 is then turned until the tapped hub of same is exerting sufficient pressure against the flange 39 to take up the desired weight on jaws 44.

When used in a service station the jacks 11 and 12 are placed under the frame of the automobile to be tested at a suitable point, the jacks are tightened to carry the desired load as described supra and the motor 19 is started up. Through the transmission as above described the jacks 11 and 12 will propagate the up and down rocking motion of the crank pins 16 to the car. Any squeaks in the springs, shackles or body of the car are thus immediately apparent and possible of location. At the same time the springs and shackles may be lubricated and the lubrication is thoroughly worked into every opening. When not in use the jacks are laid aside on a hanger and the motor unit may easily be carried indoors over night.

It will thus be seen that there has been provided a simple, inexpensive, dependable and yet unique equipment for squeak location and spring and shackle lubrication, generally of a novel and valuable type, and well calculated to attain the various objects and advantages of the invention. While various particularities of description, as to materials, parts and shapings and connections and relations of parts have been hereinabove detailed, this has been done in aid of disclosing as clearly as possible an embodiment of the invention as now preferred; and it is to be understood that these can be varied, apparently widely, within the appended claims, which define the scope of protection contemplated.

I claim as new and desire to secure by Letters Patent of the United States:

1. In a portable squeak locator for automobiles the combination of a motor-driven speed reducer; a shaft extending to both sides of said speed reducer; crank members fastened on both ends of said shaft; slotted levers engageably mounted with said crank members; a housing surrounding said speed reducer, shaft, cranks and levers, said housing being formed as a footing for the complete machine.

2. In a portable squeak locator for automobiles the combination of a motor-driven speed reducer; a shaft extending to both sides of said speed reducer; crank members fastened in 180° relation on the opposite ends of said shaft; slotted levers engageably mounted with said crank members; a housing surrounding said speed reducer, shaft, cranks and levers, the base of said housing being formed as a footing for the complete machine.

3. In a portable squeak locator for automobiles the combination of a motor-driven speed reducer; a shaft extending to both sides of said speed reducer; crank members fastened in 180° relation on the opposite ends of said shaft; slotted levers engageably mounted with said crank members; a housing surrounding said speed reducer, shaft, cranks and levers, the base of said housing being formed as a footing for the complete machine; bearings in said housing in which said slotted levers are pivoted; crank pins forming integral parts of said slotted levers and projecting axially through openings in said cover.

4. In a portable squeak locator for automobiles the combination of a motor-driven speed reducer; a shaft extending to both sides of said speed reducer; crank members fastened in a definite angular relation on the opposite ends of said shaft; slotted levers engageably mounted with said crank members; a housing surrounding said speed reducer, shaft, cranks and levers, the base of said housing being formed as a footing for the complete machine; bearings in said housing in which said slotted levers are pivoted; crank pins forming integral parts of said slotted levers and projecting axially through openings in said cover; screw jacks engageable with said crank pins whereby the motion of said crank pins may be propagated to the object to be tested.

5. In a portable squeak locator such as described in claim 4 where said crank members, slotted levers and crank pins are calculated of such dimensional relations as to give said screw jacks an upward movement during 240° of each revolution of said crank members.

ERLING HAUGLAND.